United States Patent [19]

Nix

[11] Patent Number: 5,113,845
[45] Date of Patent: May 19, 1992

[54] PORTABLE SOLAR HEATING DEVICE AND HEATING PROCESS UTILIZING SOLAR ENERGY

[76] Inventor: Martin E. Nix, P.O. Box 95173, Seattle, Wash. 98145-2173

[21] Appl. No.: 585,870

[22] Filed: Sep. 20, 1990

[51] Int. Cl.$^5$ .............................................. F24J 2/02
[52] U.S. Cl. ....................................... 126/451; 126/439
[58] Field of Search ......................... 126/451, 438, 439

[56] References Cited

U.S. PATENT DOCUMENTS

| | | | |
|---|---|---|---|
| 2,859,745 | 11/1958 | Von Brudersdorff | 126/451 |
| 3,938,497 | 2/1976 | Andrassy | 126/270 |
| 4,083,357 | 4/1978 | Fischer | 126/451 |
| 4,236,508 | 12/1980 | Kerr | 126/451 |
| 4,262,660 | 4/1981 | Ilich | 126/451 |
| 4,442,828 | 4/1984 | Takeuchi et al. | 126/451 |
| 4,546,757 | 10/1985 | Jakahi | 126/439 |
| 4,597,377 | 7/1986 | Melamed | 126/438 |

*Primary Examiner*—Carroll B. Dority
*Attorney, Agent, or Firm*—Robert W. Beach

[57] ABSTRACT

A concave parabolic reflector receiving solar rays directly and by reflection from an angularly adjustable auxiliary collecting plate and from a stationary side plate reflects such solar rays to a line focus at which material to be heated is located, which may be liquid, gas or food to be cooked. Such food may be placed in a container having a cast iron heat sink cover and such container may be an inner container enclosed in an outer container spaced from the inner container a distance sufficient to form a cooking chamber for cooking food in the outer container at a temperature lower than the temperature within the inner container. The degree of tilt of the auxiliary reflecting plate can be adjusted depending on the elevation of the sun and such plate can be swung to horizontal position to serve as a dining table.

13 Claims, 6 Drawing Sheets

PORTABLE SOLAR HEATING DEVICE AND HEATING PROCESS UTILIZING SOLAR ENERGY

BACKGROUND OF THE INVENTION

1. Field of the Invention

This invention relates to a solar heating device of the small portable type the primary use of which is cooking, and to a heating process utilizing solar energy.

2. Prior Art

While this invention can be used for heating liquids and gases, such as air, the principal utility of the device and process is for cooking.

Prior solar cookers have been of four principal types.

The simplest type of prior solar cooker is of the box type such as represented by Kerr U.S. Pat. No. 4,236,508, issued Dec. 2, 1980, which includes a box open at the top for holding food to be cooked and having a cover hingedly attached to one upper edge of the box for reflecting solar rays down into the open top of the box oven. With such a box, the rays of the sun are not sufficiently concentrated to create a temperature high enough to cook food effectively.

The second type of solar cooker is the concentrated focus type represented by the Von Brudersdorff U.S. Pat. No. 2,859,745, issued Nov. 11, 1958. The solar rays are concentrated by a double-curved concave reflector which concentrates the solar rays on a relatively small focus area so that either the size of the cooking area is smaller than desirable or the double-curved concave reflector must be larger than desirable.

A third type of prior solar cooker is shown in the Andrassy U.S. Pat. No. 3,938,497, issued Feb. 17, 1976, which directs solar rays onto a plate having a comparatively large area both by a cylindrically concave type of reflector and by flat plates. The plate to be heated may have heat-collecting fins and transfers heat to food to be cooked or to water to be heated.

The fourth type of solar cooker is of the line focus type which is the type to which the present invention relates. Line focus cookers are represented by the Fischer U.S. Pat. No. 4,083,357, issued Apr. 11, 1978, the Ilich U.S. Pat. No. 4,262,660, issued Apr. 21, 1981, and the Takeuchi et al. U.S. Pat. No. 4,442,828, issued Apr. 17, 1984. The cookers of the Fischer and Ilich patents have reflectors of parabolic shape, whereas it is not clear whether the composite reflector of the Takeuchi et al. patent is of parabolic shape or of cylindrically curved shape like the reflector of the Andrassy patent. In any event, the reflectors of all of the Fischer, Ilich and Takeuchi et al. patents concentrate solar rays along a line focus, as distinguished from an area focus as utilized by the cooker of the Andrassy patent, or from a more localized focus as in the cooker of the Von Brudersdorff patent having a double-curved concave reflector.

A disadvantage of the line focus type of solar cookers shown in the Fischer, Ilich and Takeuchi et al. patents is that they utilize only direct solar rays collected over an area substantially equal to the area of the reflector which requires much larger apparatus to obtain a predetermined heating effect than is obtained by the device of the present invention.

SUMMARY OF THE INVENTION

A principal object of the present invention is to increase the effectiveness of solar heating apparatus by increasing the collection area over which solar rays are collected without correspondingly increasing the size of the apparatus and still enabling the solar rays collected over such collection area to be concentrated effectively on a heating or cooking focal area of reasonable size.

Another object of the invention is to make use of stray solar rays and diffused light either by directing such rays and light onto a concentrating reflector or receiver to be heated and/or converting such stray rays and diffused light into useful heat.

It is also an object to utilize solar rays effectively for heating purposes without the necessity of providing a concentrating reflector driven through a predetermined path to intercept solar rays more effectively.

An incidental object is to conserve the energy in solar rays, whether in the form of light or heat, and utilize it beneficially.

More specifically, it is an object to provide an effective support for food to be cooked at a line focus of a concave concentrating reflector for solar rays.

Another object is to provide a support for food to be cooked in the form of an oven located at the line focus of a solar ray concentrating reflector.

An additional object is to provide effective and economical insulation for food to be cooked carried by a food support.

A further object is to provide a solar cooker that can be converted readily to provide a dining table.

It is also an object to provide a solar cooker which is compact in relation to its cooking capacity.

The foregoing objects can be accomplished by a solar cooker having a concave reflector for concentrating solar rays at a line focus and which has an auxiliary flat reflector for enlarging the area for collecting solar rays and directing them onto a concave solar ray concentrating reflector. An oven for containing food to be cooked is mounted in a position for holding food substantially at the line focus to which the concentrating reflector reflects the solar rays. Preferably, such auxiliary flat reflector is of an area greater than the collection area of the solar ray concentrating reflector and is mounted for movement relative to such concentrating reflector both to reflect solar rays most effectively onto the concentrating reflector and into a horizontal position covering the concentrating reflector and suitable for use as a dining table.

DETAILED DESCRIPTION

Figure 1:
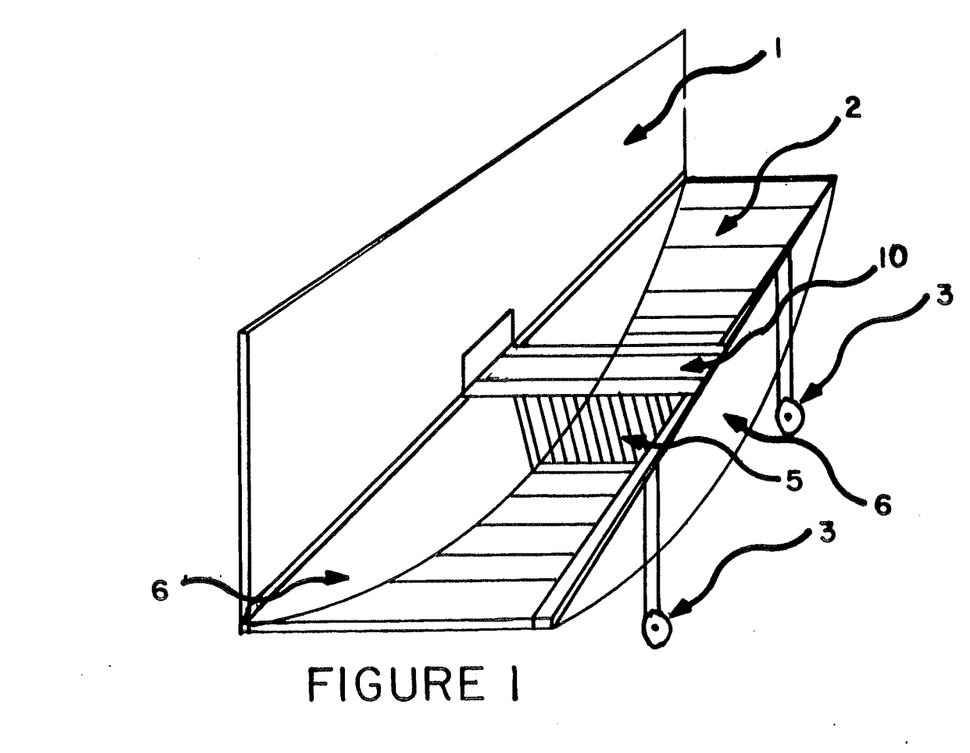
FIG. 1 is a top perspective of a portable solar heating device according to the present invention.
Figure 3:
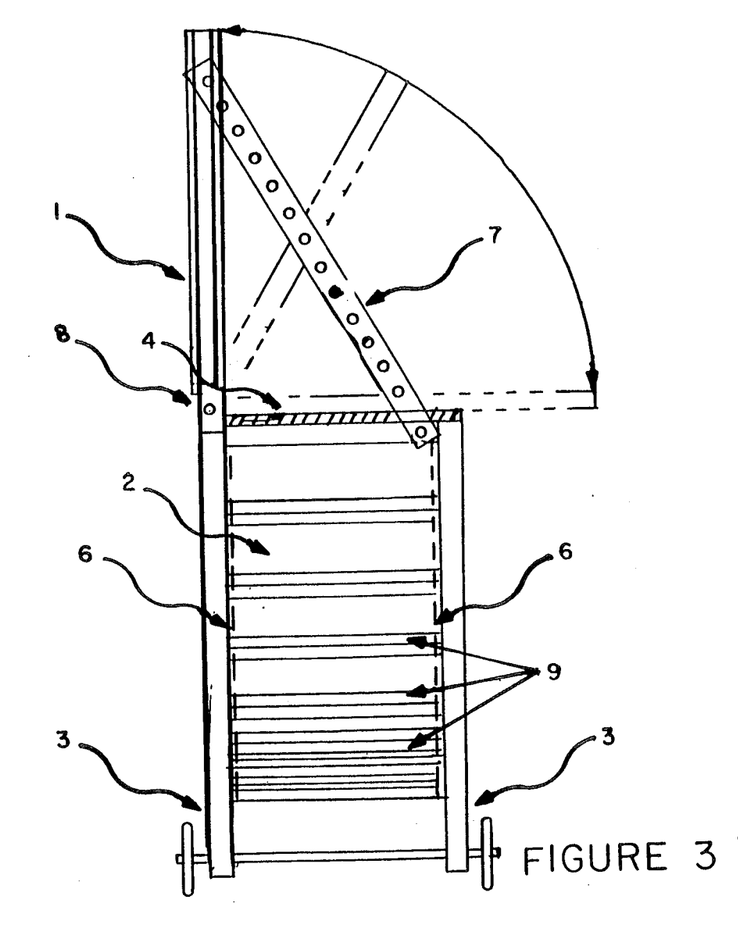
FIG. 3 is an end elevation of such heating device.
Figure 4A:
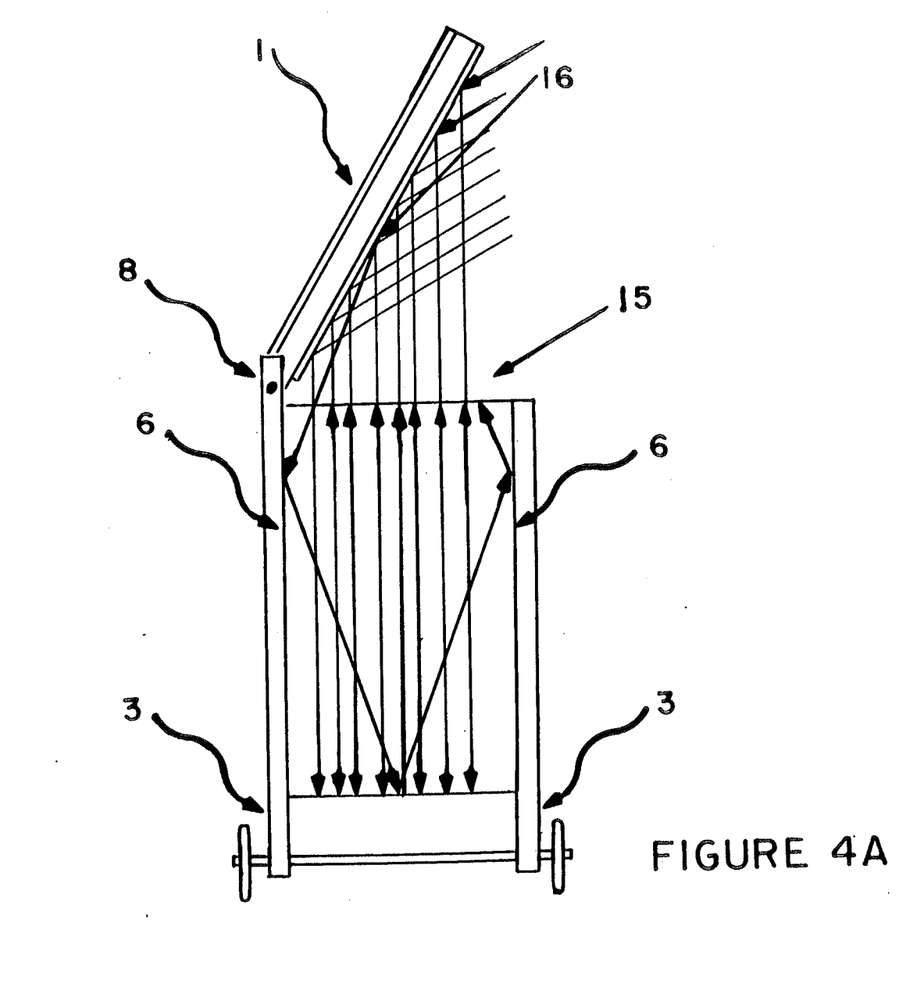
FIG. 4A is a somewhat diagrammatic transverse vertical section taken through the portable solar heating device illustrating the functioning of its components.

FIG. 1 shows generally the structure of the portable solar heating device as including an auxiliary flat reflector plate 1 swingable as indicated in FIG. 3 about its lower edge which extends along the major chord of the concave parabolic trough concentrating reflector 2 so that when swung upward as in FIGS. 3 and 4A the auxiliary reflector plate extends above such major chord of the concentrating reflector. Such concentrating reflector reflects solar rays to a line focus in the upper portion of such trough marked by the cross in FIGS. 4B and 5 of a length substantially equal to the width of such reflector. The device is mounted for mobility by legs 3 supported by small wheels or rollers.

The opposite sides of the concentrating reflector trough chamber formed by the concavity of the concentrating reflector 2 are closed by planar side plates 6 of segment shape, the lower edges of which plates form parabolic arcs complemental to the curvature of the concentrating reflector and the upper edges of which plates correspond to the major chords of such reflector. The arcuate edges of the sides 6 are secured to and support the concentrating reflector 2 by angle connectors 9 spaced arcuately, as shown in FIG. 2.

Figure 2:
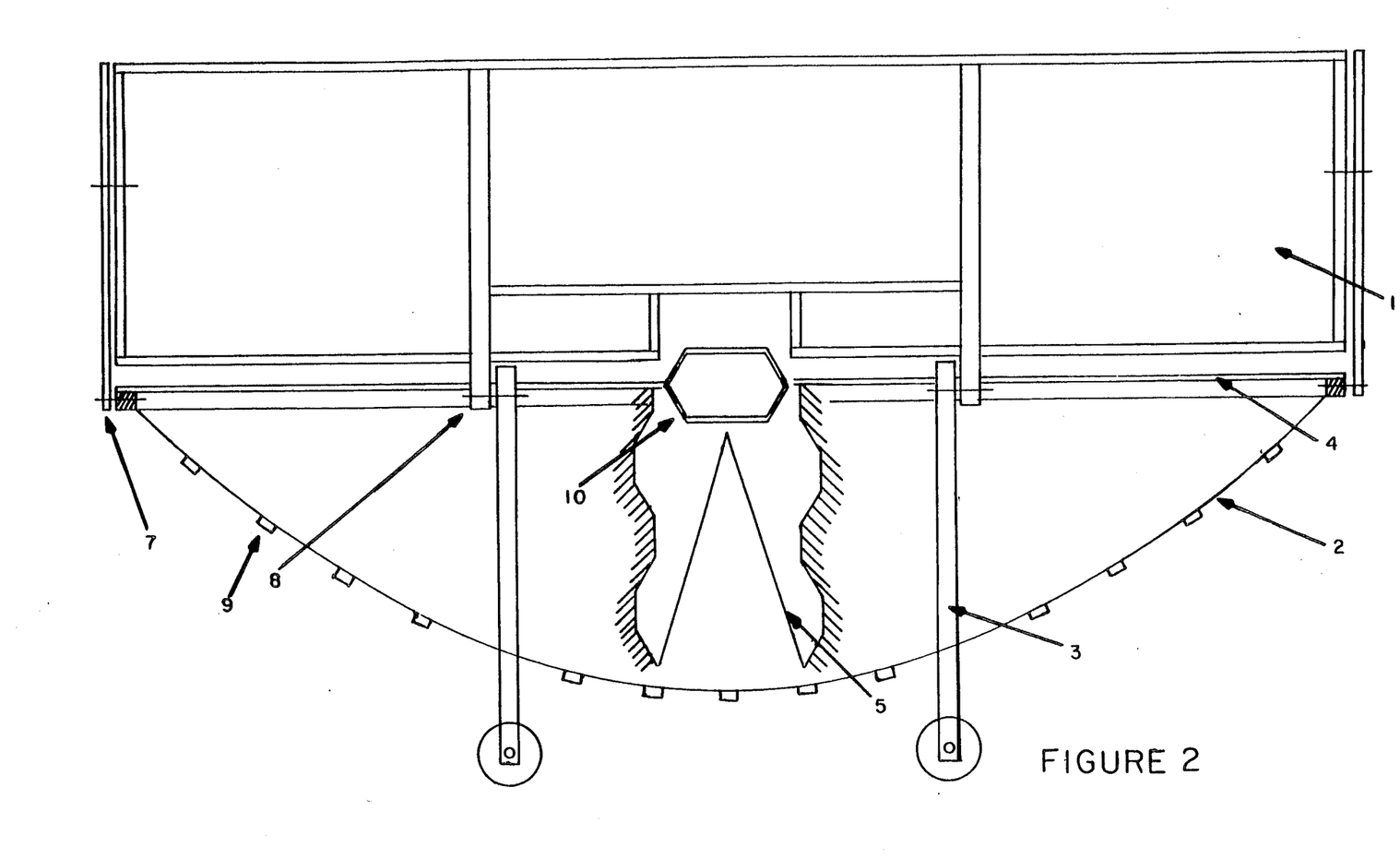
FIG. 2 is a side elevation of such heating device with parts broken away.
Figure 5:
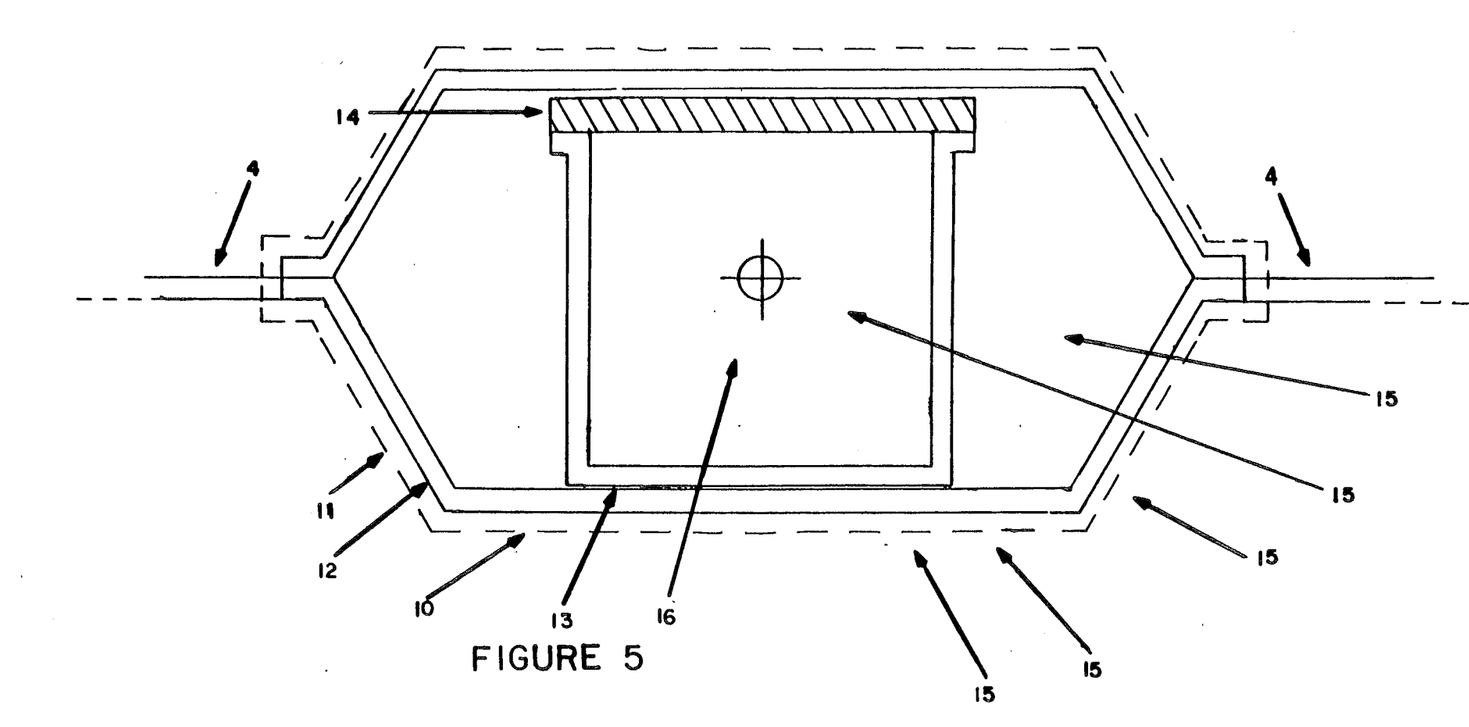
FIG. 5 is an enlarged detail vertical section through the oven component of the solar heating device.

When the solar heating device is used as a cooker, it is convenient to provide a receptacle for the food to be cooked in the form of an oven 10 shown in FIGS. 1 and 2 and in detail in FIG. 5. Such oven is elongated, being of a length approximately equal to the width of the concentrating reflector 2 and the length of the line focus. Such oven rests in a suitable cradle formed by the upper margins of the sides 6 of the concentrating reflector trough chamber.

Beneath such oven and the line focus and located generally centrally of the concentrating reflector is a stray ray recovery collector 5 for collecting stray or scattered solar rays and diffused light which includes two flat surfaces disposed generally parallel to the line focus of the concentrating reflector and converging upward in the form of a wedge. Preferably, each of such surfaces is substantially perpendicular to a plane tangential to the arc of the concentrating reflector 2 at its line of intersection with the arc of the concentrating reflector, as shown in FIG. 2. The included angle between such reflecting sides of the stray ray recovery collector is within the range of 10 degrees to 30 degrees depending upon the sharpness of curvature of the concentrating reflector 2 which, in turn, is dependent on the depth of the reflector arc and the length of its maximum chord.

The solar heating device is completed by a cover 4 transparent to solar rays closing the top of the cavity formed above the concentrating reflector 2 and between the sides 6 at the level of their chordal edges, as shown in FIGS. 2 and 3.

The auxiliary reflector plate 1 can be held in various inclined positions relative to the line focus by tilting it about the chordal edge of the side 6 on which it is mounted, as indicated in broken lines in FIG. 3. The plate can be held in various desired tilted positions by brace straps 7 adjustable in effective length which connect the edges of the auxiliary reflector plate and the ends of the concentrating reflector 2, as shown in FIG. 3. The pivots or hinges 8 mounting one edge of the auxiliary reflector plate 1 on the concentrating reflector should enable such plate to swing relative to the concentrating reflector between the vertical position shown in solid lines in FIG. 3 and the horizontal position shown in broken lines, the arcuate extent of such adjustment being indicated by the arc with arrows at its ends.

It is important that food to be cooked be supported so that it will be substantially at the line focus indicated by the cross in FIG. 5 to which the concentrating parabolic reflector 2 reflects the solar rays. Such relationship between the line focus and the food is important whatever type of support is provided for the food.

The construction of the oven 10 is shown in detail in FIG. 5 as including an outer container 12 within which is received an inner container 13. The lower portions of both containers below the line focus of the solar rays are made of material transparent to ultraviolet rays, as well as visible light rays. To provide such transmission capability, at least the lower portions of such containers preferably are made of quartz, although they can be made of Pyrex glass which has a somewhat less transmission effectiveness for the entire spectrum of wave lengths present in solar rays.

The open top of the inner container 13 is closed by a metal lid 14 having heat sink capabilities and which preferably is of cast iron. It is not disadvantageous for the lid to be opaque because it is mounted above the line focus of the concentrating reflector 2, as indicated by the cross, so that it will be impacted only by solar rays which have been reflected from or passed close to or through a portion of the food located in the inner container 13. Preferably, the inner container 13 is separable from the outer container 12 and the lid 14 rests on the upper edges of the walls of the inner container 13, but such lid could be carried on the underside of the upper section of the outer container 12.

The interior of the inner container 13 forms the primary food-cooking space, but the walls of the outer oven container 12 are spaced a substantial distance from the walls of the inner oven container 13 so as to provide a secondary cooking space between such outer container and such inner container. Because the line focus of the solar rays is at the central portion of the inner container, the temperature of the primary cooking space within such container will become considerably hotter than the temperature of the secondary cooking space between the outer container and the inner container. Consequently, such primary cooking space would be suitable for cooking meat, for example, while the secondary cooking space could be used for cooking vegetables, for example.

Whatever type of support is used for the food to be cooked, it is desirable for such food and its support to be enveloped, preferably wrapped tightly, with insulating layers of flexible material such as a plurality of enclosing oven bags 11. The bags are made of high temperature polymer such as Teflon which should be as transparent as possible to substantially the full spectrum of the solar rays but will serve as a barrier to deter the radiation of heat from the food and its support.

As shown in FIG. 1, and by a comparison of FIGS. 2 and 3, the length of the chords subtended by the arc of the concave concentrating reflector 2 is several times as great as the width of the reflector, such as approximately six times such width. The length of such chords may be 8 feet to 12 feet, for example, so that the width of such reflector would be 16 inches to 24 inches, for example. As shown in FIG. 2, the depth of the arc at the center is from 20 to 25 percent of the chord length, which would be approximately 21 or 22 inches. As shown in FIG. 2, a concentrating reflector of a length within such range and a depth at its center of approximately one-fifth to one-quarter of its arc and its subtended chord of approximately 45 degrees so that the arc will be approximately 90 degrees.

Direct solar rays will pass down through the transparent cover 4 of the concentrating reflector chamber over approximately the area of the concentrating reflector and either strike the concentrating reflector directly or will strike a sidewall 6 of the concentrating reflector chamber beneath the auxiliary reflector plate 1, in turn to be reflected downward onto the concentrating reflector 2 for redirection to the line focus.

Figure 4B:
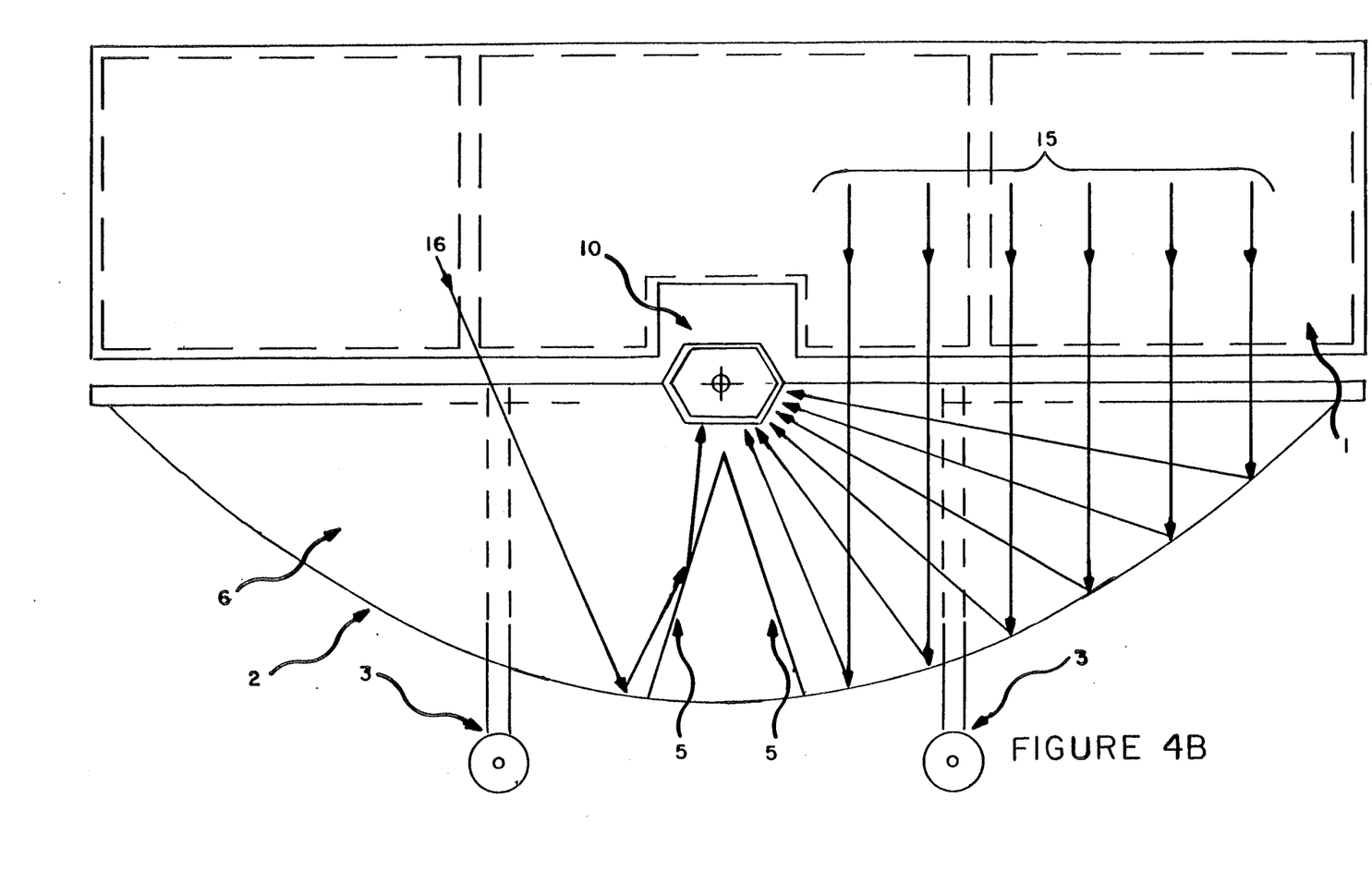
FIG. 4B is a somewhat diagrammatic longitudinal vertical section through the solar heating device also illustrating the functioning of its components.

As shown in FIGS. 1, 3, 4A and B, the flat auxiliary reflector plate 1 extends above the concave concentrating reflector trough 2 and the line focus and should be parallel to a chord of the concentrating reflector and be tilted to an attitude inclined relative to the line focus as shown in FIG. 4A such that slanted solar rays emitted by the sun at a low elevation indicated at 16 in FIG. 4A striking its under surface will be reflected downward past the line focus onto the concentrating reflector 2, in turn to be reflected back up to the line focus indicated by the cross at the middle of the oven in FIGS. 4B and 8. As shown best in FIG. 3, the auxiliary reflector plate 1 is approximately 50 percent wider than the width of the concentrating reflector 2 so that its width would be approximately 24 inches, for example. The extra width would increase the auxiliary solar ray collection area and would give an overhang over the concentration reflector, as shown in FIG. 3, which increases the convenience of using the back of the auxiliary reflector plate as a dining table when it is swung into the horizontal position indicated in FIG. 3.

It will be evident from the illustration of FIG. 4A that without tilting the concentrating reflector 2 but moving it on its wheels appropriately, the solar rays initially striking the auxiliary reflector plate 1 or the reflecting end wall 6 beneath it or the concentrating reflector 2 will all be reflected by the concentrating reflector substantially to the line focus. Stray rays that may strike the stray ray recovery collector 5 will, as shown in FIG. 4B, either be reflected toward the line focus or the oven or, if the material of the stray ray recovery collector 5 is not reflective, such collector will be heated by such stray rays and, in turn, will heat the concentrating reflector chamber and indirectly the oven 10.

The combined effect of solar rays striking the auxiliary reflector plate 1, a side plate 6 or the concentrating reflector 2 and the recovery reflector 5 is to concentrate the solar rays at the line focus with the upper edge of the concentrating reflector chamber horizontal whatever the elevation of the sun in the sky may be and whether the solar rays are more or less refracted or scattered by clouds. The result is that food at the line focus is cooked effectively by solar rays penetrating it, perhaps analogous to cooking effected by microwaves in a microwave oven. Rays that have penetrated the food or have been reflected from its surface can impinge on the heat sink lid 14 of the oven which will become heated to assist further in cooking the food by radiation and will maintain the food in the oven warm if it is allowed to remain covered when the sun is not bright or when the oven is lifted bodily and removed from its mounting at the focal line of the cooker preparatory to the food being served.

I claim:

1. A solar heating device comprising a concave upwardly-opening concentrating reflector trough for reflecting to a line focus extending axially of the upper portion of the trough solar rays striking the concave concentrating reflector, said trough having a rectangular upper opening with a length much greater than its width, the width of said opening extending axially of the trough concavity and the length of said opening extending chordwise of the trough concavity, and an auxiliary flat reflector disposed parallel to the chords of the concave concentrating reflector trough opening extending above and inclined from its lower edge over the trough at an acute angle relative to the line focus for reflecting solar rays striking it downward past the line focus onto the concave concentrating reflector trough for reflection thereby back up to the line focus.

2. In the solar heating device defined in claim 1, means mounting the auxiliary reflector for tilting adjustment about a chord of the concave concentrating reflector for positioning the auxiliary reflector in various attitudes inclined relative to the line focus.

3. In the solar heating device defined in claim 1, means mounting the auxiliary reflector for tilting adjustment about a chord of the concave concentrating reflector for positioning the auxiliary reflector in an attitude from upright to horizontal.

4. In a solar heating device including a concave concentrating reflector for reflecting to a line focus solar rays striking the concave concentrating reflector, the improvement comprising stray solar ray collecting means including two reflectors located generally centrally of the arc of the concave concentrating reflector, disposed generally parallel to the line focus and converging toward each other for reflecting toward such line focus stray solar rays striking said collecting means reflectors.

5. In a solar food cooker including a concave concentrating reflector for reflecting to a line focus solar rays striking the concave concentrating reflector, the improvement comprising an outer food-holding container elongated lengthwise of the line focus, having a portion thereof closer to the concave concentrating reflector made of material capable of transmitting most of the solar ray spectrum, and an inner container received within said outer container, elongated lengthwise of the line focus, having a portion thereof closer to the concave concentrating reflector made of material which is transparent to most of the solar ray spectrum, said inner container being of a size for holding therein food to be cooked and said inner container and said outer container being spaced apart sufficiently to provide therebetween a chamber for holding food to be cooked at a temperature lower than the temperature at which the food is to be cooked in said inner container.

6. In a solar food cooker including a concave concentrating reflector for reflecting to a line focus solar rays striking the concave concentrating reflector, the improvement comprising a food-holding container located above the concave concentrating reflector and having a lower portion which is transparent to most of the spectrum of the solar rays and an upper portion which is opaque to most of the solar ray spectrum and constitutes a heat sink, and means supporting said container in a position for passage of such line focus through said container below said opaque portion.

7. In the solar food cooker defined in claim 6, the opaque upper portion of the food-holding container being of heat-absorbing material.

8. In the solar cooker defined in claim 7, the heat-absorbing material being of metal.

9. In the solar food cooker defined in claim 7, the opaque upper portion of the container being cast iron.

10. In the solar food cooker defined in claim 6, the opaque portion of the container being a heat-absorbing metal lid.

11. In a solar food cooker including a concave concentrating reflector for reflecting to a line focus solar rays striking the concave concentrating reflector, the improvement comprising a food-holding container for holding food substantially at such line focus, and a heat-absorbing lid covering the upper portion of said food-holding container and located above the line focus to be heated by residual solar rays reflected from or passing through or close to food held by said food-holding container.

12. In a solar heating device including a concave concentrating reflector for reflecting to a line focus solar rays striking the concave concentrating reflector, the improvement comprising reflecting sides of generally segment shape closing opposite sides of the concave concentrating reflector, an auxiliary flat reflector plate mounted above one of said sides alongside the concave concentrating reflector, and means mounting said auxiliary flat reflector plate for tilting adjustment about a chord of the concave concentrating reflector for positioning said auxiliary flat reflector plate in an attitude inclined at an acute angle relative to the line focus upward from said chord of said concentrating reflector and over said concentrating reflector for reflecting solar rays striking said auxiliary flat reflector plate downward onto the concave concentrating reflector.

13. A process for utilizing solar energy including concentrating solar rays reviewed through the upper opening of a concave concentrating reflector trough to a line focus extending axially of the upper portion of such trough, the improvement comprising collecting solar rays over an area in addition to the area of the concave concentrating reflector trough upper opening, extending upward above a chord of such trough and inclined from its lower edge over such trough, and reflecting solar rays collected in such additional area downward past the line focus onto the concave concentrating reflector trough for reflection thereby upward to the line focus.

* * * * *

UNITED STATES PATENT AND TRADEMARK OFFICE
CERTIFICATE OF CORRECTION

PATENT NO. : 5,113,845
DATED      : May 19, 1992
INVENTOR(S) : Martin E. Nix

It is certified that error appears in the above-identified patent and that said Letters Patent is hereby corrected as shown below:

Claim 13:  column 8, line 9, cancel "reviewed" and insert --received--.

Signed and Sealed this

Seventeenth Day of May, 1994

Attest:

BRUCE LEHMAN

*Attesting Officer*   *Commissioner of Patents and Trademarks*